US012418746B2

(12) United States Patent
Kim et al.

(10) Patent No.: US 12,418,746 B2
(45) Date of Patent: Sep. 16, 2025

(54) METHOD FOR PROCESSING AUDIO DATA AND ELECTRONIC DEVICE SUPPORTING SAME

(71) Applicant: SAMSUNG ELECTRONICS CO., LTD., Suwon-si (KR)

(72) Inventors: Doohyun Kim, Suwon-si (KR); Yangsu Kim, Suwon-si (KR); Jaehyun Kim, Suwon-si (KR); Hakhoon Song, Suwon-si (KR); Keunwon Jang, Suwon-si (KR); Kyoungho Bang, Suwon-si (KR); Hochul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 241 days.

(21) Appl. No.: 18/228,910

(22) Filed: Aug. 1, 2023

(65) Prior Publication Data

US 2023/0379623 A1 Nov. 23, 2023

Related U.S. Application Data

(63) Continuation of application No. PCT/KR2021/019095, filed on Dec. 15, 2021.

(30) Foreign Application Priority Data

Feb. 1, 2021 (KR) ........................ 10-2021-0014098

(51) Int. Cl.
*H04R 3/00* (2006.01)

(52) U.S. Cl.
CPC ......... *H04R 3/005* (2013.01); *H04R 2203/12* (2013.01); *H04R 2420/07* (2013.01)

(58) Field of Classification Search
CPC .... G06F 3/162; G06F 3/165; G06F 2209/508; G06F 3/167; G06F 9/4843; G06F 9/5027;
(Continued)

(56) References Cited

U.S. PATENT DOCUMENTS 9,420,371 B2 8/2016 An et al.
9,510,094 B2 11/2016 Paquier et al.
(Continued)

FOREIGN PATENT DOCUMENTS

CN 107705797 A 2/2018
CN 110267160 A 9/2019
(Continued)

OTHER PUBLICATIONS

International Search Report (PCT/ISA/210) issued by the International Searching Authority on Apr. 7, 2022 in International Patent Application No. PCT/KR2021/019095.
(Continued)

*Primary Examiner* — Lun-See Lao
(74) *Attorney, Agent, or Firm* — Sughrue Mion, PLLC

(57) ABSTRACT

Provided is a an electronic device and method of operating same. The electronic device includes: a wireless communication circuit configured to perform wireless communication with an external electronic device; an audio input device; at least one memory storing one or more instructions; and at least one processor operatively connected to the at least one memory and configured to execute the one or more instructions to: obtain first audio data through the audio input device, wherein the first audio data is synthetic data of a first signal received from a first talker and a second signal received from a second talker, and the first talker is closer to the electronic device than the second talker at the time the first audio data is obtained, receive second audio data from the external electronic device through the wireless commu-
(Continued)

nication circuit, wherein the second audio data is synthetic data of a third signal and a fourth signal, obtain a latency based on the first audio data and the second audio data, obtain compensated first audio data by compensating for the latency with respect to the second audio data, and obtain processed first audio data by removing the second signal from the compensated first audio data based on the third signal.

20 Claims, 10 Drawing Sheets

(58) Field of Classification Search
CPC .. H04R 2420/07; H04R 25/552; H04R 3/005; H04R 5/033; H04R 5/04; H04R 1/08; H04R 1/1041; H04R 1/1083; H04R 2203/12; H04R 2430/01; H04R 2430/23; H04R 2460/01; H04R 25/505; H04R 25/558; H04R 3/00; H04R 3/04; H04R 3/14; H04S 7/304; H04S 2400/01; H04S 2400/11; H04S 2400/13; H04S 2420/01; H04S 3/008; G10K 15/02; G10K 15/08; G10L 2021/02082; G10L 2021/02166; G10L 21/02; G10L 21/0208
USPC .................................. 381/92, 324, 1; 700/94
See application file for complete search history.

(56) References Cited

U.S. PATENT DOCUMENTS

| | | | |
|---|---|---|---|
| 9,641,933 B2 | 5/2017 | Appelbaum et al. | |
| 9,756,422 B2 | 9/2017 | Paquier et al. | |
| 9,824,674 B2 | 11/2017 | Takahashi et al. | |
| 10,388,301 B2 | 8/2019 | Kim et al. | |
| 10,615,816 B2 | 4/2020 | Jang et al. | |
| 10,798,494 B2 | 10/2020 | Kamkar-Parsi et al. | |
| 11,115,761 B2 * | 9/2021 | Courtois | H04R 25/405 |
| 2004/0215799 A1 * | 10/2004 | Lehmann, Jr. | H04L 12/1827 709/230 |
| 2011/0255703 A1 | 10/2011 | Jansse et al. | |
| 2014/0064519 A1 * | 3/2014 | Silfvast | G10H 1/18 381/119 |
| 2018/0041849 A1 * | 2/2018 | Farmani | H04R 25/405 |
| 2019/0304477 A1 * | 10/2019 | Wojcieszak | G10L 19/24 |
| 2020/0178004 A1 | 6/2020 | Courtois et al. | |
| 2021/0314525 A1 * | 10/2021 | Raduchel | H04N 21/2187 |
| 2022/0159376 A1 | 5/2022 | Zhang | |

FOREIGN PATENT DOCUMENTS

| | | | |
|---|---|---|---|
| CN | 111402913 | A | 7/2020 |
| JP | 6191572 | B2 | 9/2017 |
| KR | 10-2011-0102474 | A | 9/2011 |
| KR | 10-2014-0120195 | A | 10/2014 |
| KR | 10-2017-0024315 | A | 3/2017 |
| KR | 10-2017-0052056 | A | 5/2017 |
| KR | 10-1915322 | B1 | 11/2018 |
| KR | 10-2019-0045506 | A | 5/2019 |

OTHER PUBLICATIONS

Written Opinion (PCT/ISA/237) issued by the International Searching Authority on Apr. 7, 2022 in International Patent Application No. PCT/KR2021/019095.

Communication issued on Jun. 12, 2025 by the Korean Intellectual Property Office in Korean Patent Application No. 10-2021-0014098.

* cited by examiner

METHOD FOR PROCESSING AUDIO DATA AND ELECTRONIC DEVICE SUPPORTING SAME

CROSS-REFERENCE TO RELATED APPLICATIONS

This application is a by-pass continuation of International Application No. PCT/KR2021/019095, filed on Dec. 15, 2021, which is based on and claims priority to Korean Patent Application No. 10-2021-0014098, filed on Feb. 1, 2021, in the Korean Intellectual Property Office, the disclosures of which are incorporated by reference herein in their entireties.

BACKGROUND

1. Field

The disclosure relates to a method for processing audio data and an electronic device supporting the same.

2. Description of Related Art

With the development of mobile communication technology, an electronic device may perform a speech recognition function for controlling a device by recognizing a user's voice and/or a function (e.g., a video call or video conference) for obtaining the user's voice and transmitting and/or receiving audio data corresponding to the voice with an external electronic device. Moreover, the electronic device may perform a recording function for recording audio data (e.g., recording). Furthermore, the electronic device may also perform a mirroring function for displaying a screen displayed on a display included in the electronic device (e.g., a smart phone) to an external electronic device (e.g., a television ("TV")). For example, the electronic device may obtain audio data from the user by using at least one audio input device (e.g., a microphone) to perform the above functions. At this time, the audio data obtained by the electronic device may include reverberation.

The reverberation may refer to a noise signal generated from the outside other than a user's voice signal by using the electronic device. For example, in addition to audio data obtained from a near-end talker, the electronic device may obtain audio data generated from a far-end talker as reverberation.

The electronic device may provide a function for minimizing distortion of audio data by using a technology such as beamforming in an environment where noise is present. For example, in the above example, the electronic device may further include various types of reverberation removal devices to remove a reverberation signal obtained from a far-end talker. For example, the electronic device may include a reverberation removal device that removes reverberation by using a minimum variance distortionless response (MVDR) beamformer. The electronic device may remove a reverberation component by using the reverberation removal device.

When a plurality of electronic devices provide a function for transmitting and receiving audio data, an electronic device performs an operation of removing reverberation without considering the reverberation of audio data obtained by an external electronic device, and thus additional data distortion (e.g., data distortion) may occur in a process of transmitting and receiving audio data.

Moreover, because the reverberation removal operation of the electronic device generally requires complex calculations, data processing time or required load (e.g., load) is a burden on the electronic device. As a result, the electronic device may fail to effectively eliminate reverberation due to the issues described above.

SUMMARY

According to an aspect of the disclosure, an electronic device includes: a wireless communication circuit configured to perform wireless communication with an external electronic device; an audio input device; at least one memory storing one or more instructions; and at least one processor operatively connected to the at least one memory and configured to execute the one or more instructions to: obtain first audio data through the audio input device, wherein the first audio data is synthetic data of a first signal received from a first talker and a second signal received from a second talker, and the first talker is closer to the electronic device than the second talker at the time the first audio data is obtained, receive second audio data from the external electronic device through the wireless communication circuit, wherein the second audio data is synthetic data of a third signal and a fourth signal, obtain a latency based on the first audio data and the second audio data, obtain compensated first audio data by compensating for the latency with respect to the second audio data, and obtain processed first audio data by removing the second signal from the compensated first audio data based on the third signal.

The at least one processor may be further configured to execute the one or more instructions to: obtain the processed first audio data by removing the second signal from the compensated first audio data via beamforming.

The electronic device may further include: an audio output device, wherein the at least one processor may be further configured to execute the one or more instructions to: output the processed first audio data via the audio output device.

The at least one processor may be further configured to execute the one or more instructions to: transmit the processed first audio data to the external electronic device through the wireless communication circuit.

The at least one processor may be further configured to execute the one or more instructions to: after transmitting the processed first audio data to the external electronic device, receive third audio data comprising the second audio data without the fourth signal, from the external electronic device through the wireless communication circuit.

The electronic device may further include: a display, wherein the at least one processor may be further configured to execute the one or more instructions to: display, on the display, a user interface corresponding to a function for mixing pieces of audio data; and based on determining that a specified input on the user interface is sensed, generate synthetic data by mixing the processed first audio data and the third audio data.

A first frequency band of the third audio data may be changed to a second frequency band through a bandwidth extension filter.

The latency based on the first audio data and the second audio data may include a system latency and an acoustic latency, and wherein the at least one processor may be further configured to execute the one or more instructions to: obtain the system latency based on wireless communication between the electronic device and the external electronic device; and obtain the acoustic latency based on a change in a location of the external electronic device relative to the electronic device.

The at least one processor may be further configured to execute the one or more instructions to: identify a dominant frequency band of the first audio data and the second audio data.

The at least one processor may be further configured to execute the one or more instructions to: obtain the acoustic latency based on the dominant frequency band based on a cross-correlation method.

According to an aspect of the disclosure, a method of processing audio data using an electronic device includes: obtaining first audio data through an audio input device of the electronic device, wherein the first audio data is synthetic data of a first signal received from a first talker and a second signal received from a second talker, and the first talker is closer to the electronic device than the second talker at the time the first audio data is obtained; receiving second audio data from an external electronic device through a wireless communication circuit of the electronic device, wherein the second audio data is synthetic data of a third signal and a fourth signal; obtaining a latency based on the first audio data and the second audio data; obtain compensated first audio data by compensating for the latency with respect to the second audio data; and obtaining processed first audio data removing the second signal from the compensated first audio data based on the third signal.

The obtaining the processed first audio data may further include removing the second signal from the compensated first audio data via beamforming.

The method may further include: outputting the processed first audio data via an audio output device of the electronic device.

The method may further include: transmitting the processed first audio data to the external electronic device through the wireless communication circuit.

The method may further include: after transmitting the processed first audio data to the external electronic device, receiving third audio data comprising the second audio data without the fourth signal, from the external electronic device through the wireless communication circuit.

The method may further include: displaying, on a display of the electronic device, a user interface corresponding to a function for mixing pieces of audio data; and based on determining that a specified input on the user interface is sensed, generating synthetic data by mixing the processed first audio data and the third audio data.

A first frequency band of the third audio data may be changed to a second frequency band through a bandwidth extension filter.

The calculating of the latency based on the first audio data and the second audio data may include: obtaining a system latency based on wireless communication between the electronic device and the external electronic device; and obtaining an acoustic latency based on a change in a location of the external electronic device relative to the electronic device.

The calculating of the acoustic latency may include identifying a dominant frequency band of the first audio data and the second audio data.

The identifying the dominant frequency band of the first audio data and the second audio data may include obtaining the acoustic latency in the dominant frequency band based on a cross-correlation method.

According to one or more embodiments, an electronic device may provide an efficient reverberation cancellation function by performing an operation of identifying audio data obtained from a far-end talker and audio data obtained from a near-end talker, receiving the identified audio data from an external electronic device, and removing reverberation by using the identified audio data.

Further, according to one or more embodiments, an electronic device may provide a user with an intuitive audio experience by clearly distinguishing main data (e.g., audio data obtained from a near-end talker) required to provide various functions (e.g., a video calling function, a recording function, and/or a mirroring function) from sub data (e.g., audio data obtained from a far-end talker).

Various effects directly or indirectly understood through the specification may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to any description of the drawings herein, the same or similar components will be marked by the same or similar reference signs.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein may be variously made without departing from the scope and spirit of the disclosure.

Figure 1:
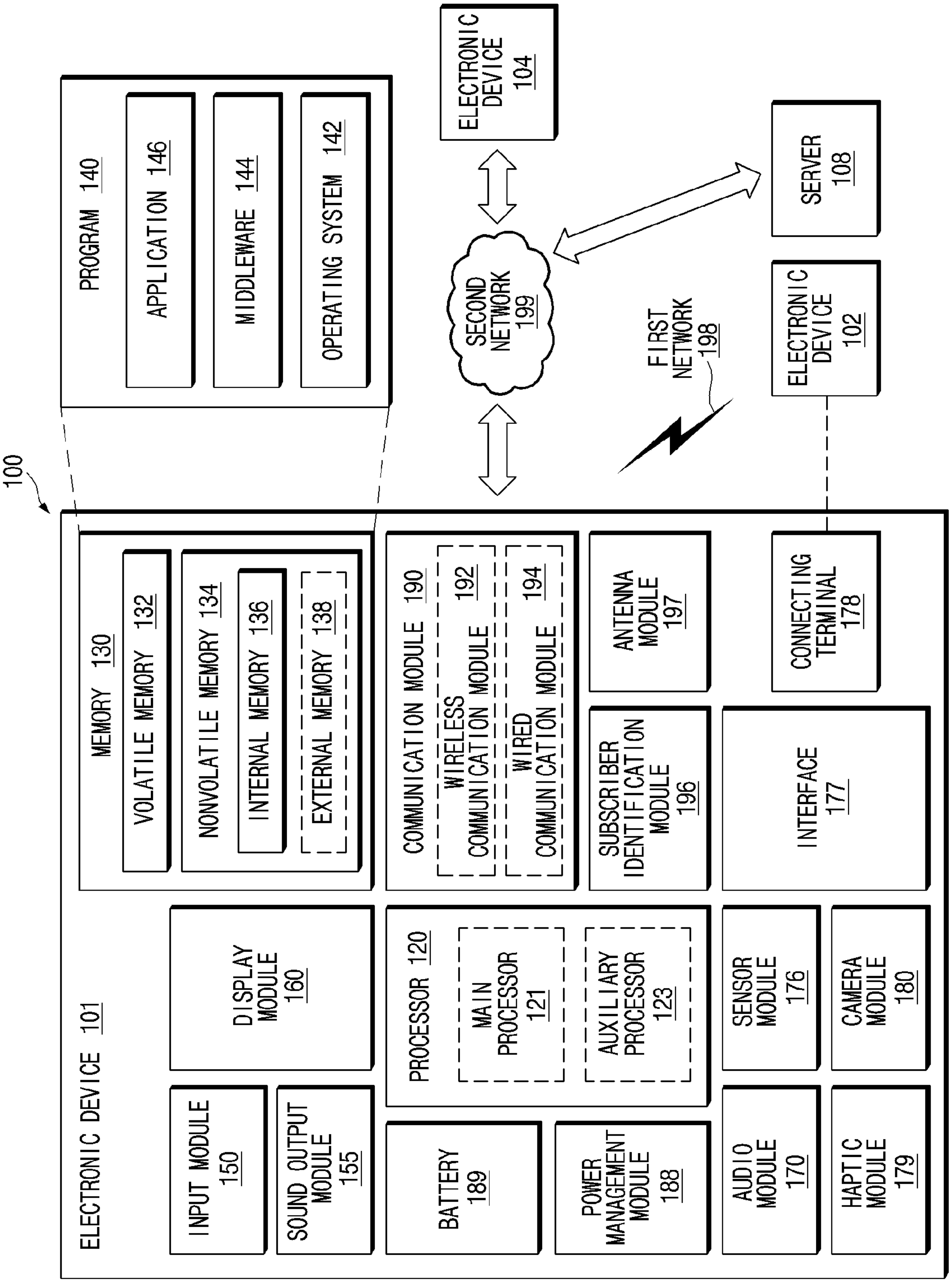
FIG. 1 is a block diagram of an electronic device in a network environment, according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
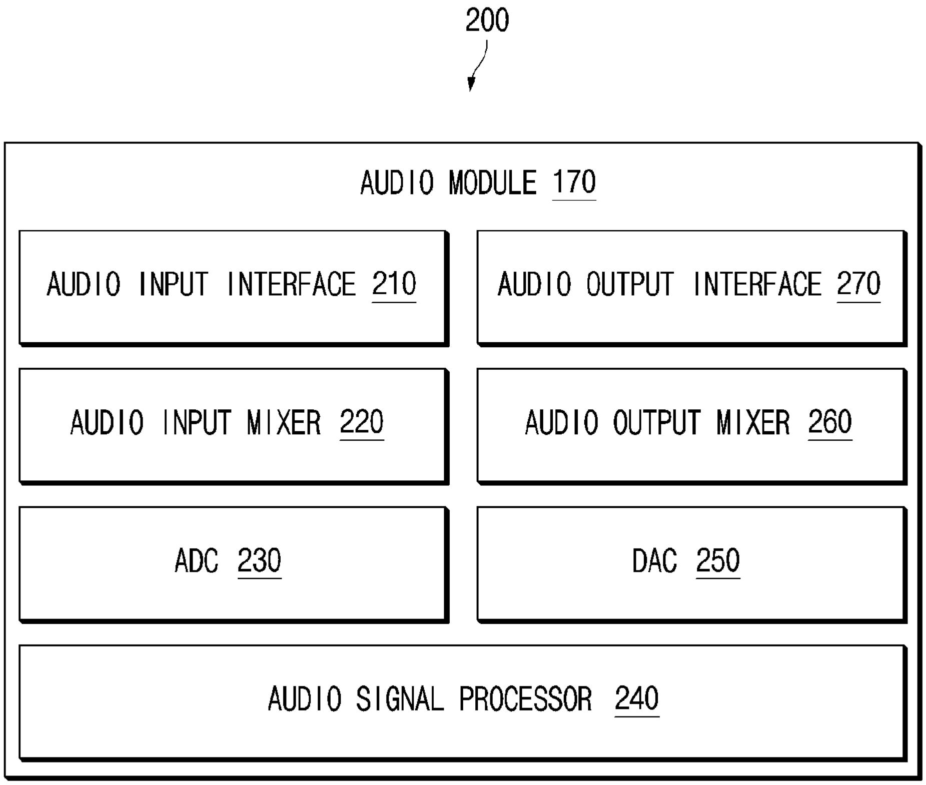
FIG. 2 is a block diagram of an audio module, according to various embodiments of the disclosure.

FIG. 2 is a block diagram 200 illustrating the audio module 170 according to various embodiments. Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3:
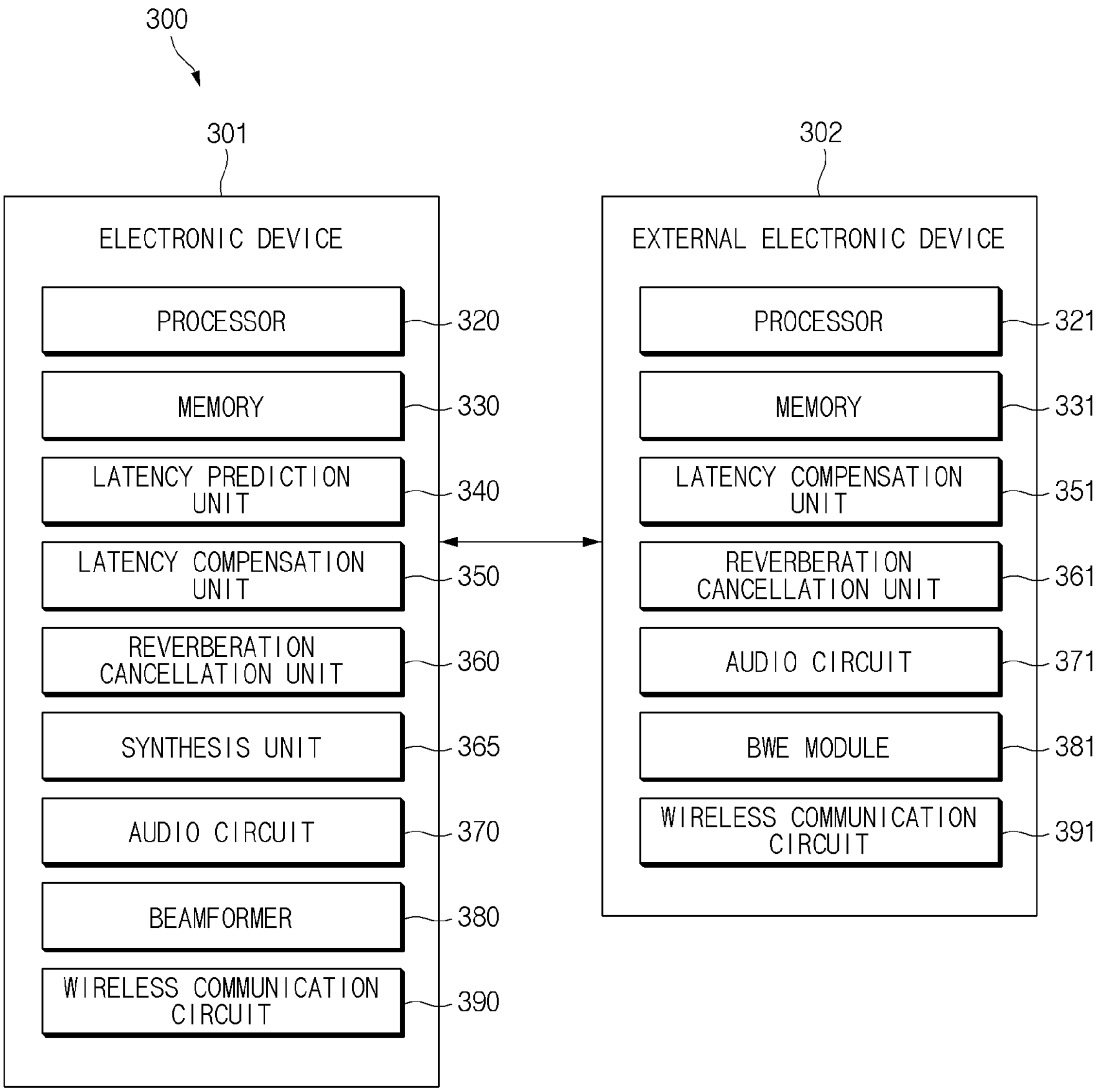
FIG. 3 is a block diagram of components included in electronic devices, according to an embodiment of the disclosure.

FIG. 3 is a block diagram 300 of components included in electronic devices 301 and 302, according to an embodiment.

Referring to FIG. 3, an electronic device (e.g., the electronic device 101 in FIG. 1) according to an embodiment may include a processor 320 (e.g., the processor 120 in FIG. 1), a memory 330 (e.g., memory 130 in FIG. 1), a latency prediction unit 340, a latency compensation unit 350, a reverberation cancellation unit 360, a synthesis unit 365, an audio circuit 370 (e.g., the audio module 170 in FIG. 1), a beamformer 380, and/or a wireless communication circuit 390 (e.g., the communication module 190 of FIG. 1). The configuration of the electronic device 301 illustrated in FIG. 3 is an example, and embodiments of the disclosure are not limited thereto. For example, the electronic device 301 is shown as including one of the audio circuit 370. However, the electronic device 301 may further include at least one audio input device thus physically separated and at least one audio output device physically separated. In other words, the audio circuit 370 may include at least one physically separated audio input device (e.g., the input module 150 of FIG. 1) and at least one physically separated audio output device (e.g., the sound output module 155 of FIG. 1). For another example, the electronic device 301 may further include components (e.g., the display module 160, the sensor module 176, the interface 177, and/or the antenna module 197 in FIG. 1).

According to an embodiment, the processor 320 may include a main processor (e.g., a central proceeding unit (CPU)) (e.g., the main processor 121 in FIG. 1), which processes various processes executed by the electronic device 301 and the external electronic device 302, and an auxiliary processor (e.g., the auxiliary processor 123 in FIG. 1) for processing processes related to an audio input/output. The processor 320 may be implemented as a system-on-chip (SoC). The processor 320 may perform an overall control function of operations performed by components to be described later.

According to an embodiment, the processor 320 may be operatively connected to the memory 330, the latency prediction unit 340, the latency compensation unit 350, the reverberation cancellation unit 360, the synthesis unit 365, the audio circuit 370, the beamformer 380, and/or the wireless communication circuit 390. For example, the processor 320 may control an audio data processing function provided by the electronic device 301 by using information stored in the memory 330. For example, the processor 320 may obtain at least one audio data by using the audio circuit 370. For example, the processor 320 may perform a data processing function for the obtained at least one audio data by using the latency prediction unit 340, the latency compensation unit 350, and the reverberation cancellation unit 360. The processor 320 may selectively further use another component (e.g., the beamformer 380) other than the above-described components to perform the data processing function. For example, the processor 320 may mix at least pieces of audio data by using the synthesis unit 365. The processor 320 may transmit and/or receive various pieces of data from the outside (e.g., an external electronic device 302) through the wireless communication circuit 390.

According to an embodiment, the memory 330 may store one or more instructions that, when executed, cause the processor 320 to perform various operations of the electronic device 301.

The latency prediction unit 340, the latency compensation unit 350, the reverberation cancellation unit 360, and the synthesis unit 365 may be implemented by one or more processors of the at least one processor 320.

According to an embodiment, the latency prediction unit 340 may calculate latency between pieces of audio data. For example, the latency prediction unit 340 may calculate latency between audio data (e.g., first audio data) obtained by the electronic device 301 through the audio circuit 370 and audio data (e.g., second audio data) obtained from the external electronic device 302 through the wireless communication circuit 390. The latency may mean system latency, which occurs while the electronic device 301 performs wireless communication (e.g., Bluetooth communication) with the external electronic device 302, and/or acoustic latency (e.g., acoustic delay) generated as a location of the external electronic device 302 is changed based on the electronic device 301. For example, the latency prediction unit 340 may include a system delay prediction unit and/or an acoustic delay prediction unit. For example, the system delay prediction unit may perform an operation of calculating system latency generated in a process in which the electronic device 301 performs wireless communication with the external electronic device 302. For another example, the acoustic delay prediction unit may calculate the acoustic latency generated as a location of the external electronic device 302 is changed based on the electronic device 301. For another example, the acoustic delay prediction unit may extract a dominant frequency band of pieces of audio data. The acoustic delay prediction unit may identify the extracted dominant frequency band and then may calculate acoustic latency within the identified frequency band based on a cross-correlation method.

According to an embodiment, the latency compensation unit 350 may perform an operation (e.g., interpolation) of compensating for latency calculated from the latency prediction unit 340. The latency compensation unit 350 may identify latency calculated from the latency prediction unit 340 and may compensate for the latency based on the identification result. For example, the latency compensation unit 350 may divide the latency into system latency (e.g., system delay) and acoustic delay (e.g., acoustic delay) and then may identify the system latency and the acoustic delay. The latency compensation unit 350 may compensate for the identified system delay and/or acoustic delay. For example, the latency compensation unit 350 may compensate for the latency, which is calculated by the latency prediction unit 340, with respect to the second audio data received from the external electronic device 302.

According to an embodiment, the reverberation cancellation unit 360 may perform an operation of removing a reverberation component of audio data (e.g., first data). For example, the reverberation cancellation unit 360 may perform an operation of removing at least one signal among a plurality of voice signals, which are included in the first audio data obtained by the electronic device 301 by using the audio circuit 370. The first audio data may include a first signal and a second signal. For example, the first signal may correspond to a voice signal received from a near-end talker based on the electronic device 301. The second signal may correspond to a voice signal from a far-end talker. For example, the reverberation cancellation unit 360 may determine that the second signal corresponds to a reverberation component, by using a specified reference signal (e.g., a fourth signal in the second audio data received from the external electronic device 302). The reverberation cancellation unit 360 may perform an operation of removing the second signal from the first audio data based on the determination result. For example, the reverberation cancellation unit 360 may remove the second signal from the first audio data based on a fourth signal included in the second audio data obtained as the latency compensation unit 350 compensates for latency.

According to an embodiment, the synthesis unit 365 may perform an operation of mixing pieces of audio data. For example, the synthesis unit 365 may perform an operation of mixing the first audio data, from which the second signal is removed by the above-described reverberation cancellation unit 360, with other audio data (e.g., the second audio data obtained as the external electronic device 302 removes a fourth signal). For example, when it is determined that a specified input is detected on a user interface displayed on a display (e.g., the display module 160 in FIG. 1) included in the electronic device 301, the synthesis unit 365 may generate synthetic data by mixing the first audio data, from which the second signal is removed, and the second audio data from which the fourth signal is removed. For example, the user interface may be referred to as a user interface corresponding to a function for mixing pieces of audio data. The user interface may include a variety of content (e.g., icons and/or graphic user interfaces (GUI)) related to a function for mixing pieces of audio data.

According to an embodiment, the audio circuit 370 may include at least part of an audio input device included in the electronic device 301 or a microphone (e.g., a dynamic microphone, a condenser microphone, or a piezo microphone) implemented separately from the electronic device. The audio circuit 370 may receive a voice signal corresponding to a sound obtained from the outside (e.g., a user) of the electronic device 301 by using at least one audio input device. For example, the audio circuit 370 may receive the first signal from a near-end talker by using the audio input device and may receive the second signal from a far-end talker. The processor 320 may obtain first audio data, which is synthetic data of the first signal and the second signal, through the audio circuit 370. The audio circuit 370 may include at least one audio output device (e.g., the sound output module 155 of FIG. 1). For example, the audio circuit 370 may include a speaker (SPK) or receiver (RCV) such as a dynamic driver or a balanced armature driver as an audio output device. When the electronic device 301 includes a plurality of speakers, the audio circuit 370 may control an audio output interface (e.g., the audio output interface 270 in FIG. 2) for outputting audio data having a plurality of different channels (e.g., stereo, or 5.1 channels) through at least part of the plurality of speakers. For example, the audio circuit 370 may output a voice signal corresponding to audio data, which is determined to be output through at least one audio output device, to the outside. For example, the audio output interface may be connected to an external electronic device 302 (e.g., an external speaker or headset), directly via a connecting terminal or wirelessly via a wireless communication module and then may output a voice signal.

According to an embodiment, the beamformer 380 may perform a beamforming operation necessary to improve directivity while a plurality of audio input devices included in the electronic device 301 obtain audio data. For example, the beamformer 380 may maintain the first signal received in a specified direction (e.g., a direction of a near-end talker). On the other hand, the beamformer 380 may perform an operation of at least partially removing the second signal received in a direction (e.g., a direction of a far-end talker) other than the specified direction. For example, the beamformer 380 may include a minimum variance distortionless response (MVDR) beamformer. For example, the beamformer 380 may be implemented as a generalized sidelobe canceller (GSC).

According to an embodiment, the wireless communication circuit 390 may perform an operation of electrically connecting the electronic device 301 and the outside (e.g., the external electronic device 302). For example, when audio data is obtained from the external electronic device 302 through the wireless communication circuit 390, an audio input interface (e.g., the audio input interface 210 in FIG. 2) included in the electronic device 301 may be directly connected to the external electronic device 302 through a connecting terminal (e.g., the connecting terminal 178 in FIG. 1) or wirelessly (e.g., Bluetooth communication) through the wireless communication circuit 390 to receive audio data. For example, additionally or alternatively, an audio input interface may receive an audio signal (e.g., a first signal and/or a second signal) from another component (e.g., the processor 320 or the memory 330) of the electronic device. For example, the processor 320 may convert the audio signal into audio data by using an analog to digital converter (ADC) (e.g., the ADC 230 of FIG. 2) included in the audio circuit 370. For example, the electronic device 301 may transmit information related to latency calculated by using the latency prediction unit 340 to the external electronic device 302 through the wireless communication circuit 390.

According to an embodiment, the external electronic device 302 may include at least one processor 321, a memory 331, a latency compensation unit 351, a reverberation cancellation unit 361, an audio circuit 371, a bandwidth extension (BWE) module 381 (e.g., a BWE module), and/or a wireless communication circuit 391. The configuration of the external electronic device 302 illustrated in FIG. 3 is an example, and embodiments of the disclosure are not limited thereto. For example, the external electronic device 302 is shown as including one of the audio circuit 371. However, the external electronic device 302 may further include at least one audio input device thus physically separated and at least one audio output device physically separated. In other words, the audio circuit 371 may include at least one physically separated audio input device (e.g., the input module 150 of FIG. 1) and at least one physically separated audio output device (e.g., the sound output module 155 of FIG. 1). For another example, the external electronic device 302 may further include components (e.g., the sensor module 176, the interface 177, and/or the antenna module 197 in FIG. 1). Descriptions of components (e.g., the processor 321, the memory 331, the latency compensation unit 351, the reverberation cancellation unit 361, the audio circuit 371, and the wireless communication circuit 391) having the same names as those included in the electronic device 301 among the components included in the external electronic device 302 may be replaced with descriptions of the components of the electronic device 301 described above.

The latency compensation unit 351 and the reverberation cancellation unit 361 may be implemented by one or more processors of the at least one processor 321.

According to an embodiment, the processor 321 included in the external electronic device 302 may be operatively connected to the memory 331, the latency compensation unit 351, the reverberation cancellation unit 361, the audio circuit 371, the BWE module 381 (e.g., a BWE module), and/or the wireless communication circuit 391. For example, the processor 321 may control an audio data processing function provided by the external electronic device 302 by using information stored in the memory 331.

The latency compensation unit 351 included in the external electronic device 302 may perform an operation (e.g., interpolation) of compensating for latency between pieces of audio data. For example, the latency compensation unit 351 may perform an operation of compensating for the latency between audio data (e.g., the first audio data from which the second signal is removed) received from the electronic device 301 through the wireless communication circuit 391 and audio data (e.g., the second audio data) obtained through the audio circuit 371. For example, the latency compensation unit 351 may compensate for the latency based on a latency value calculated by the latency prediction unit 340 included in the electronic device 301. For example, the external electronic device 302 may receive information related to latency of pieces of audio data from the electronic device 301 and then may compensate for the latency between pieces of audio data through the latency compensation unit 351 based on the received information.

According to an embodiment, the BWE module 381 may perform an operation of changing a frequency band of audio data. For example, the external electronic device 302 may have a different playback frequency band required to output (e.g., play) audio data from that of the electronic device 301. Accordingly, when outputting at least one of audio data (e.g., the second audio data) obtained by using the audio circuit 371 and audio data (e.g., the second audio data from which the fourth signal is removed) received from the electronic device 301 through the wireless communication circuit 391, the external electronic device 302 may change a frequency band of audio data determined to be output into a specified frequency band (e.g., 48 kHz). For example, the BWE module 381 may change a frequency band of at least part of audio data obtained by using the audio circuit 371 to a specified frequency band so as to be output to the outside (e.g., the electronic device 301).

Descriptions of the audio circuit 371 and/or the wireless communication circuit 391 included in the external electronic device 302 may be replaced with descriptions of the audio circuit 370 and/or the wireless communication circuit 390 of the electronic device 301 described above.

In FIG. 3, descriptions of components included in the electronic device 301 and/or the external electronic device 302 are examples and are not limited thereto. For example, like the electronic device 301, the external electronic device 302 may include the latency prediction unit 340, the synthesis unit 365, and/or the beamformer 380. For another example, the beamformer 380 is shown as a separate component distinguished from other components. However, the beamformer 380, which is one component of the reverberation cancellation unit 360, may be implemented as a single component together with the reverberation cancellation unit 360.

Figure 4:
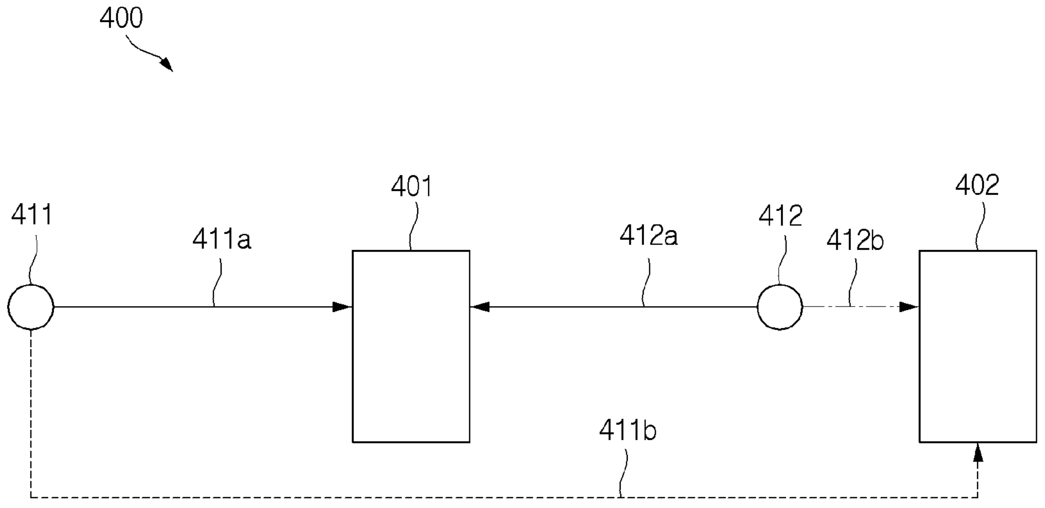
FIG. 4 is a conceptual diagram illustrating an audio data processing of an electronic device and an external electronic device, according to an embodiment of the disclosure.

FIG. 4 is a conceptual diagram 400 illustrating an audio data processing of an electronic device 401 and an external electronic device 402, according to an embodiment.

According to an embodiment, the electronic device 401 (e.g., the electronic device 101 in FIG. 1 or the electronic device 301 in FIG. 3) may receive various voice signals from the outside (or a user) 411 and/or 412 by using at least one of a plurality of audio input devices included in an audio circuit (e.g., the audio circuit 370 in FIG. 3). For example, referring to reference number 411*a*, the electronic device 401 may receive a first signal from a first user 411 corresponding to a near-end talker based on the electronic device 401. For another example, referring to reference number 412*a*, the electronic device 401 may receive a second signal from a second user 412 corresponding to a far-end talker based on the electronic device 401. In other words, the electronic device 401 may obtain first audio data, which is synthetic data of a first signal received from the first user 411 and a second signal received from the second user 412, through an audio input device.

According to an embodiment, the external electronic device 402 (e.g., the electronic device 102 in FIG. 1 or the external electronic device 302 in FIG. 3) may receive various voice signals from the outside (or a user) 411 and/or 412 by using at least one of a plurality of audio input devices included in an audio circuit (e.g., the audio circuit 371 in FIG. 3). For example, referring to reference number 412*b*, the external electronic device 402 may receive a third signal from the second user 412 corresponding to a near-end talker based on the external electronic device 402. For another example, referring to reference number 411*b*, the external electronic device 402 may receive a fourth signal from the first user 411 corresponding to a far-end talker based on the external electronic device 402. In other words, the external electronic device 402 may obtain second audio data, which is synthetic data of the third signal received from the second user 412 and the fourth signal received from the first user 411, through an audio input device. The external electronic device 402 may transmit the obtained the second audio data to the electronic device 401 through a wireless communication circuit (e.g., the wireless communication circuit 391 in FIG. 3).

According to an embodiment, the electronic device 401 may perform various audio data processing functions by using the first audio data and the second audio data received from the external electronic device 402.

According to an embodiment, the electronic device 401 may calculate latency based on the first audio data and the second audio data by using a latency prediction unit (e.g., the latency prediction unit 340 in FIG. 3). For example, the latency prediction unit may include a system delay prediction unit and an acoustic delay prediction unit. For example, the electronic device 401 may calculate system latency occurring in a process in which the electronic device 401 performs wireless communication (e.g., Bluetooth communication) with the external electronic device 402 by using the system delay prediction unit included in the latency prediction unit. For another example, the electronic device 401 may calculate acoustic latency, which is generated as a location of the external electronic device 402 is changed based on the electronic device 401, by using the acoustic delay prediction unit included in the latency prediction unit.

According to an embodiment, the electronic device 401 may compensate for (or interpolate) the latency (e.g., system latency and/or acoustic latency) calculated through the latency prediction unit by using a latency compensation unit (e.g., the latency compensation unit 350 in FIG. 3). A description of the latency compensation unit compensating for latency may be replaced with the description of the latency compensation unit 350 of FIG. 3 described above.

According to an embodiment, the electronic device 401 may perform an operation of removing a specified signal included in at least part of audio data among pieces of audio data by using a reverberation cancellation unit (e.g., the reverberation cancellation unit 360 in FIG. 3). For example, the electronic device 401 may remove the second signal included in the first audio data based on the third signal included in the second audio data by using the reverberation cancellation unit. For example, the electronic device 401 may perform an operation of identifying that the second signal corresponds to a signal (or a reverberation signal) received by the far-end talker based on the electronic device 401 by using the third signal included in the second audio data and removing the second signal from the first audio data. In other words, the electronic device 401 may perform a reverberation cancellation operation of removing the second signal by using the third signal as a reference signal. For another example, the electronic device 401 may perform a beamforming operation by using a beamformer (e.g., the beamformer 380 in FIG. 3). The electronic device 401 may have a relatively greater directivity for a voice signal (e.g., the first signal) generated from a near-end talker than a voice signal (e.g., the second signal) generated from a far-end talker, through a beamforming operation using a beamformer.

According to an embodiment, the electronic device 401 may perform a reverberation cancellation operation on the first audio data and then may output the first audio data, from which the second signal is removed, to the outside. For example, the electronic device 401 may transmit the first audio data, from which the second signal is removed, to the external electronic device 402 through a wireless communication circuit (e.g., the wireless communication circuit 390 in FIG. 3).

According to an embodiment, the electronic device 401 may transmit the first audio data, from which the second signal is removed, to the external electronic device 402 and then may receive the second audio data, from which the fourth signal is removed, from the external electronic device 402 through the wireless communication circuit. An operation in which the electronic device 401 receives the second audio data, from which the fourth signal is removed, from the external electronic device 402 may be described in more detail with reference to FIGS. 5 to 8 to be described later.

Figure 5:
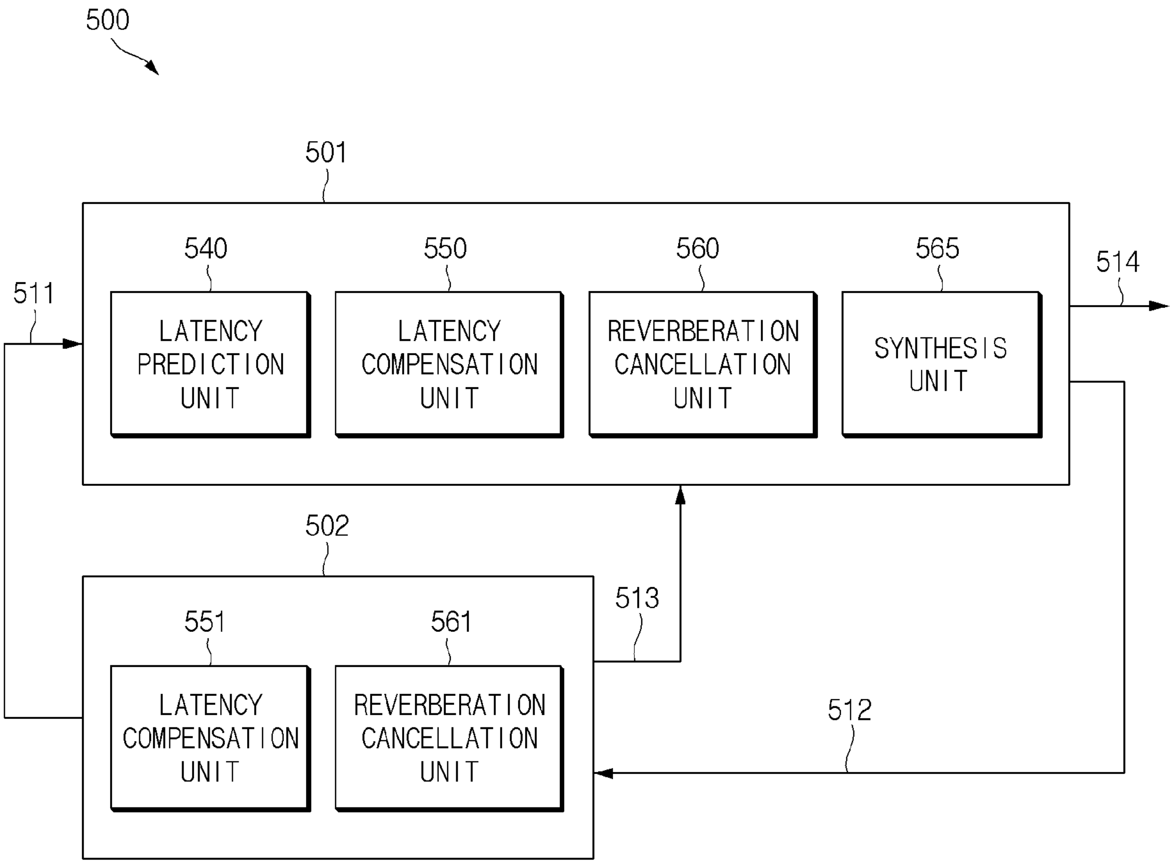
FIG. 5 is a block diagram illustrating an audio data processing of an electronic device and an external electronic device, according to an embodiment of the disclosure.

FIG. 5 is a block diagram 500 illustrating an audio data processing of an electronic device 501 and an external electronic device 502, according to an embodiment.

According to an embodiment, the electronic device 501 (e.g., the electronic device 101 in FIG. 1 or the electronic device 301 in FIG. 3) may transmit and/or receive various pieces of data with the external electronic device 502 (e.g., the electronic device 102 in FIG. 1 or the external electronic device 302 in FIG. 3) through a wireless communication circuit (e.g., the wireless communication circuit 390 in FIG. 3). All or part of configurations of a latency prediction unit 540, a latency compensation unit 550, a reverberation cancellation unit 560, a synthesis unit 565, a latency compensation unit 551, and a reverberation cancellation unit 561 in FIG. 5 are the same as those of the latency prediction unit 340, the latency compensation unit 350, the reverberation cancellation unit 360, the synthesis unit 365, the latency compensation unit 351, and the reverberation cancellation unit 361 of FIG. 3. Hereinafter, a data transmission/reception process between the electronic device 501 and the external electronic device 502 will be described.

According to an embodiment, referring to reference number 511, the electronic device 501 may receive various pieces of data from the external electronic device 502 through a wireless communication circuit. For example, the electronic device 501 may receive second audio data obtained by the external electronic device 502 by using an audio input device. The second audio data may be referred to as "synthetic data" of a third signal, which is received by the external electronic device 502 from a second user (e.g., the second user 412 in FIG. 4) through the audio input device, and a fourth signal received from a first user (e.g., the first user 411 in FIG. 4). For example, the first user may be a far-end talker based on the external electronic device 502. The second user may be a near-end talker based on the external electronic device 502.

According to an embodiment, referring to reference number 512, the electronic device 501 may transmit various pieces of data to the external electronic device 502 through a wireless communication circuit. For example, the electronic device 501 may transmit first audio data, from which a second signal is removed, to the external electronic device 502. The electronic device 501 may remove the second signal among the first signal and the second signal, which are included in the first audio data, by using the first audio data obtained through an audio input device (e.g., the audio circuit 370 in FIG. 3) and the second audio data received from the external electronic device 502. The first audio data may be referred to as "synthetic data" of the first signal, which is received by the electronic device 501 from a first user through an audio input device, and the second signal received from a second user. For example, the first user may be a near-end talker based on the electronic device 501. The second user may be a far-end talker based on the electronic device 501. According to an embodiment, the electronic device 501 may calculate latency based on the first audio data and the second audio data by using the latency prediction unit 540. The latency prediction unit 540 may include a system delay prediction unit and an acoustic delay prediction unit that respectively calculate system latency and acoustic latency (e.g., acoustic delay). The electronic device 501 may calculate the system latency, which is generated while the electronic device 501 performs wireless communication (e.g., Bluetooth communication) with the external electronic device 502, by using a system delay prediction unit and may calculate the acoustic latency generated as a location of the external electronic device 502 is changed based on the electronic device 501, by using an acoustic delay prediction unit. According to an embodiment, the electronic device 501 may compensate for (or interpolate) latency, which is calculated by the latency prediction unit 540, by using the latency compensation unit 550. According to an embodiment, the electronic device 501 may remove the second signal included in the first audio data based on the third signal included in the second audio data by using the reverberation cancellation unit 560. For example, the electronic device 501 may drive the reverberation cancellation unit 560 with reference to the third signal included in the second audio data as a reference signal. According to an embodiment, the electronic device 501 may transmit, to the external electronic device 502, the first audio data output after the second signal is removed by the reverberation cancellation unit 560.

According to an embodiment, referring to reference number 513, the external electronic device 502 may transmit various pieces of data to the electronic device 501 through a wireless communication circuit. For example, the external electronic device 502 may transmit, to the electronic device 501, the second audio data from which the fourth signal is removed. The external electronic device 502 may remove the fourth signal included in the second audio data by using the first audio data, from which the second signal received from the electronic device 501 is removed, and the second audio data. According to an embodiment, the external electronic device 502 may compensate for latency between the first audio data, from which the second signal received from the electronic device 501 is removed, and the second audio data by using the latency compensation unit 551. Latency-related information necessary in a process of compensating for latency may be received from the electronic device 501, and the latency compensation unit 551 may be driven based on the received information. According to an embodiment, the external electronic device 502 may remove the fourth signal included in the second audio data based on the first signal included in the first audio data received from the electronic device 501 by using the reverberation cancellation unit 561. For example, the external electronic device 502 may drive the reverberation cancellation unit 561 with reference to the first signal included in the first audio data as a reference signal. According to an embodiment, the external electronic device 502 may transmit the second audio data, which is output after the fourth signal is removed by the reverberation cancellation unit 561, to the electronic device 501.

According to an embodiment, referring to reference number 514, the electronic device 501 may output various pieces of data to the outside. For example, the electronic device 501 may output synthetic data, which is generated by mixing pieces of audio data, to the outside by using an audio output device (e.g., the audio circuit 370 in FIG. 3). According to an embodiment, the electronic device 501 may generate synthetic data by mixing the first audio data, from which the second signal is removed, and the second audio data, from which the fourth signal is removed, by using the synthesis unit 565 and then may output the generated synthetic data by using the audio output device to the outside. According to an embodiment, the electronic device 501 may further include a display (e.g., the display module 160 of FIG. 1). For example, the electronic device 501 may display a user interface corresponding to a function for mixing pieces of audio data on the display. When it is determined that a specified input to the user interface is detected, the electronic device 501 may mix pieces of audio data (e.g., the first audio data, from which a second signal is removed, and the second audio data, from which a fourth signal is removed) determined based on the specified input by using the synthesis unit 565. For example, the user interface may be referred to as a user interface corresponding to a function for mixing pieces of audio data. The user interface may include a variety of content (e.g., icons and/or graphic user interfaces (GUI)) related to a function for mixing pieces of audio data. The electronic device 501 may output the first audio data, from which the second signal is removed, and the second audio data, from which the fourth signal is removed, to the outside. In an embodiment, the electronic device 501 and/or the external electronic device 502 may record (or capture) various pieces of audio data by using at least one microphone (e.g., the input module 150 in FIG. 1). For example, the electronic device 501 and/or the external electronic device 502 may perform stereo recording of various pieces of audio data by using two or more microphones. For example, the electronic device 501 and/or the external electronic device 502 may record audio data (e.g., the first audio data, from which the second signal is removed, and the second audio data, from which the fourth signal is removed) output from the electronic device 501 by using at least one microphone.

Figure 6:
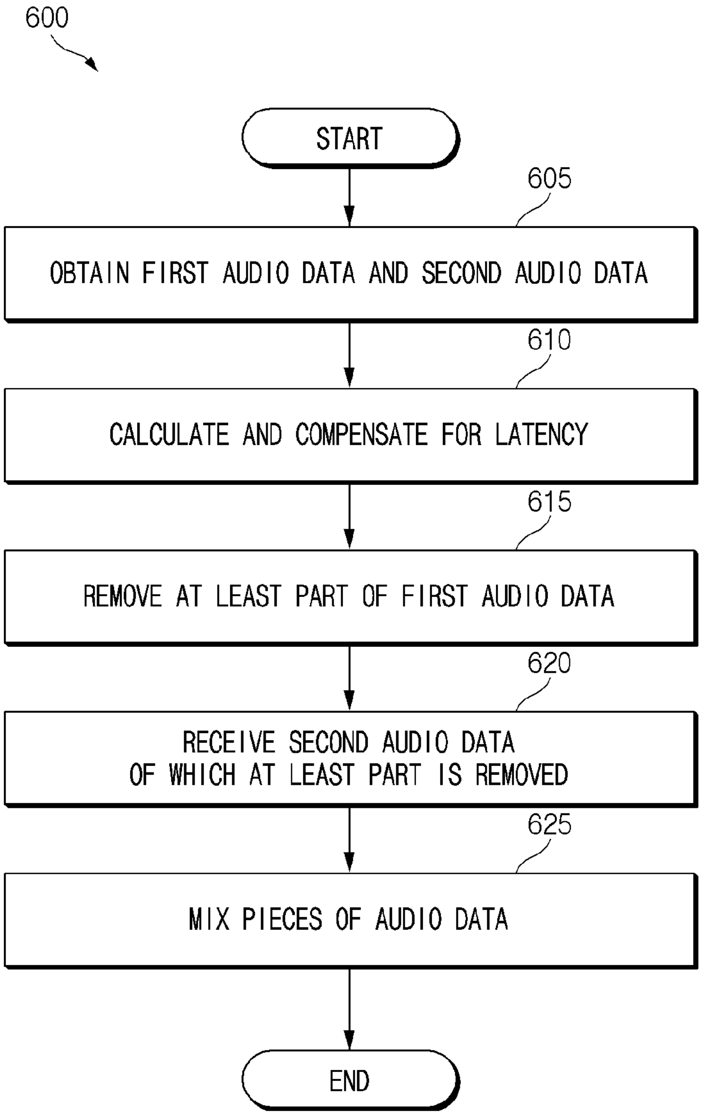
FIG. 6 is a flowchart of an audio data processing operation of an electronic device and an external electronic device, according to an embodiment of the disclosure.

FIG. 6 is a flowchart 600 of an audio data processing operation of an electronic device and an external electronic device, according to an embodiment.

According to an embodiment, an electronic device (e.g., the electronic device 101 in FIG. 1 or the electronic device 301 in FIG. 3) and an external electronic device (e.g., the electronic device 102 in FIG. 1 or the external electronic device 302 in FIG. 3) may perform the operations described in FIG. 6. For example, a processor of the electronic device (e.g., the processor 120 of FIG. 1) may be configured to perform operations of FIG. 6 when instructions stored in a memory (e.g., the memory 130 of FIG. 1) are executed.

In operation 605, the electronic device may obtain first audio data and second audio data. For example, the electronic device may obtain the first audio data, which is synthetic data of a first signal received from a first user (e.g., the first user 411 in FIG. 4) and a second signal received from a second user (e.g., the second user 412 in FIG. 4) by using an audio input device (e.g., the audio circuit 370 in FIG. 3). For another example, the electronic device may receive the second audio data, which is synthetic data of a third signal and a fourth signal, from an external electronic device through a wireless communication circuit (e.g., the wireless communication circuit 390 in FIG. 3). For example, the third signal may be an audio signal obtained by the external electronic device from the second user by using an audio input device (e.g., the audio circuit 371 in FIG. 3). The fourth signal may be an audio signal obtained from the first user by the external electronic device by using an audio input device.

In operation 610, the electronic device may calculate and compensate for (or interpolate) latency. For example, the electronic device may calculate the latency by using a latency prediction unit (e.g., the latency prediction unit 340 in FIG. 3) based on pieces of audio data (e.g., the first audio data and the second audio data). The electronic device may compensate for the calculated latency by using a latency compensation unit (e.g., the latency compensation unit 350 in FIG. 3). The latency may include a system delay time, which occurs in a process of wireless communication between the electronic device and the external electronic device, and an acoustic delay time, which occurs as a location of the external electronic device is changed based on the electronic device. The electronic device may calculate system latency and acoustic latency by using a system delay prediction unit and an acoustic delay prediction unit, which are included in the latency prediction unit, respectively. For example, the electronic device may extract a dominant frequency band of the first audio data and the second audio data by using the acoustic delay prediction unit and may calculate the acoustic latency in the dominant frequency band based on a cross-correlation method. The electronic device may compensate for the system latency and the acoustic latency by using a latency compensation unit.

In operation 615, the electronic device may remove at least part of the first audio data. For example, the electronic device may remove the second signal included in the first audio data based on the third signal included in the second audio data by using a reverberation cancellation unit (e.g., the reverberation cancellation unit 360 of FIG. 3). For example, the electronic device may identify the second signal as a reverberation signal based on the third signal and then may remove the second signal identified as the reverberation signal by using the reverberation cancellation unit.

In operation 620, the electronic device may receive the second audio data, of which at least part is removed, from the external electronic device. For example, the electronic device may receive the second audio data, from which the fourth signal is removed, from the external electronic device through a wireless communication circuit. For example, the external electronic device may obtain the second audio data, which is synthetic data of the third signal and the fourth signal, by using an audio input device (e.g., the audio circuit 371 in FIG. 3) and may receive the first audio data, from which the second signal is removed, from the electronic device through a wireless communication circuit (e.g., the wireless communication circuit 391 in FIG. 3). The external electronic device may identify the fourth signal as a reverberation signal based on the second signal and may remove the fourth signal identified as a reverberation signal by using a reverberation cancellation unit (e.g., the reverberation cancellation unit 361 in FIG. 3). The external electronic device may transmit the second audio data, from which the fourth signal is removed, to the electronic device.

In operation 625, the electronic device may mix pieces of audio data. For example, the electronic device may mix the first audio data, from which the second signal is removed, and the second audio data, from which the fourth signal is removed, by using a synthesis unit (e.g., the synthesis unit 365 in FIG. 3). For example, the electronic device may output synthetic data generated by the synthesis unit to the outside by using an audio output device (e.g., the audio circuit 370 in FIG. 3). For example, the electronic device may further include a display (e.g., the display module 160 of FIG. 1). The electronic device may display a user interface corresponding to a function for mixing pieces of audio data on a display, and may generate synthetic data by mixing the first audio data from which the second signal is removed and the second audio data from which the fourth signal is removed, by using a synthesis unit when it is determined that a specified input on the user interface is sensed.

Figure 7:
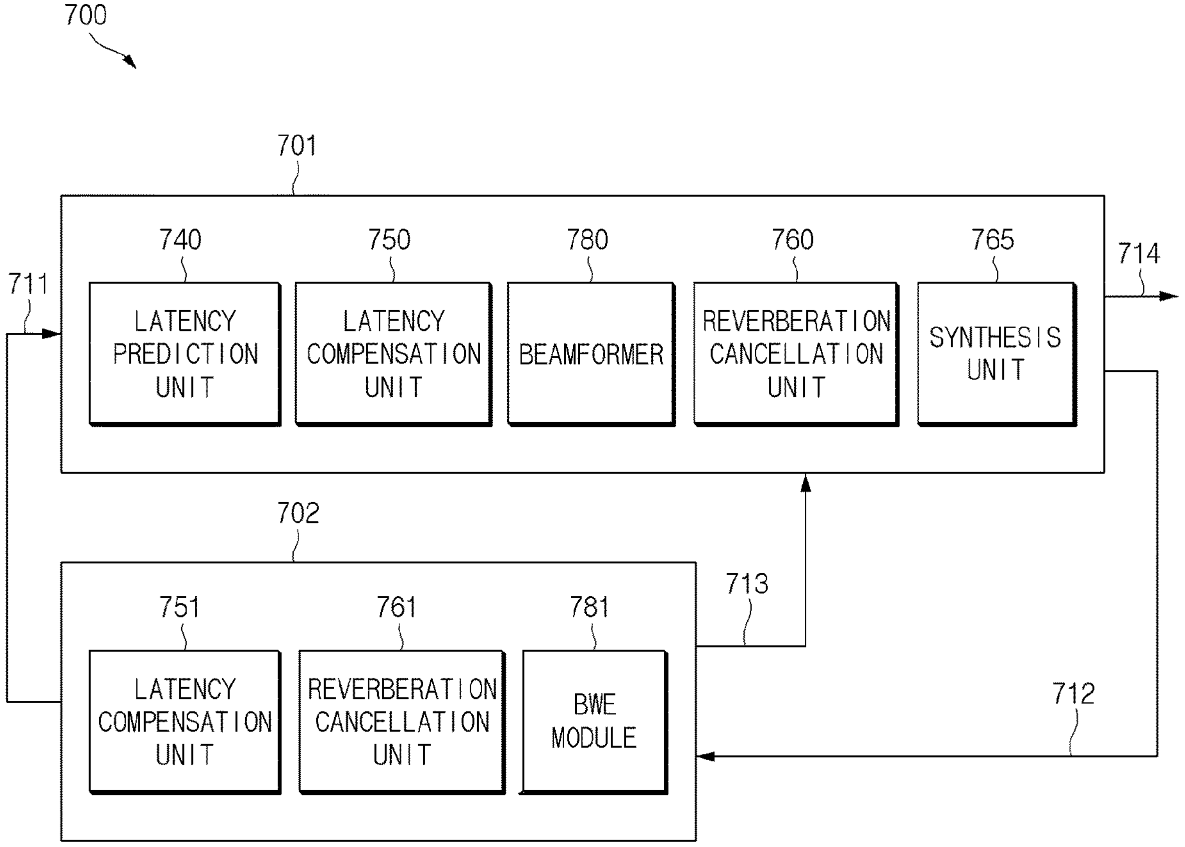
FIG. 7 is a block diagram illustrating an audio data processing of an electronic device and an external electronic device, according to an embodiment of the disclosure.

FIG. 7 is a block diagram 700 illustrating an audio data processing of an electronic device 701 and an external electronic device 702, according to an embodiment.

Descriptions of components (e.g., a latency prediction unit 740, latency compensation units 750 and 751, reverberation cancellation units 760 and 761, and a synthesis unit 765) having the same names as the components shown in FIG. 5 among components shown in FIG. 7 may be replaced with the above-described descriptions of FIG. 5. All or part of configurations of the beamformer 780 and the BWE module 781 of FIG. 7 may be the same as those of the beamformer 380 and the BWE module 381 of FIG. 3.

According to an embodiment, the electronic device 701 (e.g., the electronic device 101 in FIG. 1 or the electronic device 301 in FIG. 3) may transmit and/or receive various pieces of data with the external electronic device 702 (e.g., the electronic device 102 in FIG. 1 or the external electronic device 302 in FIG. 3) through a wireless communication circuit (e.g., the wireless communication circuit 390 in FIG. 3). For example, the electronic device 701 may process at least one audio data obtained through an audio input device (e.g., the audio circuit 370 of FIG. 3) and then may transmit the processed audio data to the external electronic device 702 through a wireless communication circuit. For another example, the electronic device 701 may receive at least one audio data, which is obtained by the external electronic device 702 through an audio input device (e.g., the audio circuit 371 of FIG. 3) and then processed, through a wireless communication circuit.

According to an embodiment, referring to reference number 711, the electronic device 701 may receive various pieces of data from the external electronic device 702 through a wireless communication circuit. For example, the electronic device 701 may receive second audio data obtained by the external electronic device 702 by using an audio input device.

According to an embodiment, referring to reference number 712, the electronic device 701 may transmit various pieces of data to the external electronic device 702 through a wireless communication circuit. For example, the electronic device 701 may transmit first audio data, from which a second signal is removed, to the external electronic device 702. The electronic device 701 may remove a second signal among the first signal and the second signal, which are included in the first audio data, by using the first audio data obtained through an audio input device and the second audio data received from the external electronic device 702. The electronic device 701 may obtain the first audio data by using the beamformer 780. For example, the electronic device 701 may perform a beamforming operation in a process of obtaining audio data by using the beamformer 780. For example, the beamformer 780 may maintain the first signal received in a specified direction (e.g., a direction of a near-end talker). On the other hand, the beamformer 380 may perform an operation of at least partially removing the second signal received in a direction (e.g., a direction of a far-end talker) other than the specified direction. For example, the beamformer 780 may include a minimum variance distortionless response (MVDR) beamformer. For example, the beamformer 780 may be implemented as a generalized sidelobe canceller (GSC). According to an embodiment, descriptions of components (e.g., the latency prediction unit 740, the latency compensation unit 750, the reverberation cancellation unit 760, and/or the synthesis unit 765) other than the beamformer 780 of the electronic device 701 may be replaced with descriptions of components corresponding to the same names in FIG. 3 or FIG. 5.

According to an embodiment, referring to reference number 713, the external electronic device 702 may transmit various pieces of data to the electronic device 701 through a wireless communication circuit. For example, the external electronic device 702 may transmit, to the electronic device 701, the second audio data from which the fourth signal is removed. The external electronic device 702 may remove the fourth signal included in the second audio data by using the first audio data, from which the second signal received from the electronic device 701 is removed, and the second audio data. According to an embodiment, the external electronic device 702 may further include the BWE module 781. The external electronic device 702 may change the frequency band of audio data by using the BWE module 781. For example, a playback frequency band (e.g., 48 kHz) required to output (e.g., play) audio data of the external electronic device 702 may be different from a playback frequency band (e.g., 128 kHz, 192 kHz, or 320 kHz) of the electronic device 701. Accordingly, when outputting at least one of audio data (e.g., the second audio data) obtained by using an audio input device (e.g., the audio circuit 371 of FIG. 3) and audio data (e.g., the second audio data from which the fourth signal is removed) received from the electronic device 701 through a wireless communication circuit (e.g., the wireless communication circuit 391 of FIG. 3), the external electronic device 702 may change a frequency band of audio data determined to be output into a specified frequency band (e.g., 48 kHz). For example, the BWE module 781 may change a frequency band of at least part of audio data obtained by using an audio input device into a specified frequency band so as to be output to the outside (e.g., the electronic device 701). According to an embodiment, descriptions of components (e.g., the latency compensation unit 751 or the reverberation cancellation unit 761) other than the BWE module 781 of the external electronic device 702 may be replaced with descriptions of components corresponding to the same names in FIG. 3 or FIG. 5.

According to an embodiment, referring to reference number 714, the electronic device 701 may output various pieces of data to the outside. For example, the electronic device 701 may output synthetic data, which is generated by mixing pieces of audio data, to the outside by using an audio output device (e.g., the audio circuit 370 in FIG. 3). According to an embodiment, the electronic device 701 may generate synthetic data by mixing the first audio data, from which the second signal is removed, and the second audio data, from which the fourth signal is removed, by using the synthesis unit 765 and then may output the generated synthetic data by using the audio output device to the outside. According to an embodiment, the electronic device 701 may further include a display (e.g., the display module 160 of FIG. 1). For example, the electronic device 701 may display a user interface corresponding to a function for mixing pieces of audio data on the display. When it is determined that a specified input to the user interface is detected, the electronic device 701 may mix pieces of audio data (e.g., the first audio data, from which a second signal is removed, and the second audio data, from which a fourth signal is removed) determined based on the specified input by using the synthesis unit 765. For example, the user interface may be referred to as a user interface corresponding to a function for mixing pieces of audio data. The user interface may include a variety of content (e.g., icons and/or graphic user interfaces (GUI)) related to a function for mixing pieces of audio data. The electronic device 701 may output the first audio data, from which the second signal is removed, and the second audio data, from which the fourth signal is removed, to the outside.

Figure 8:
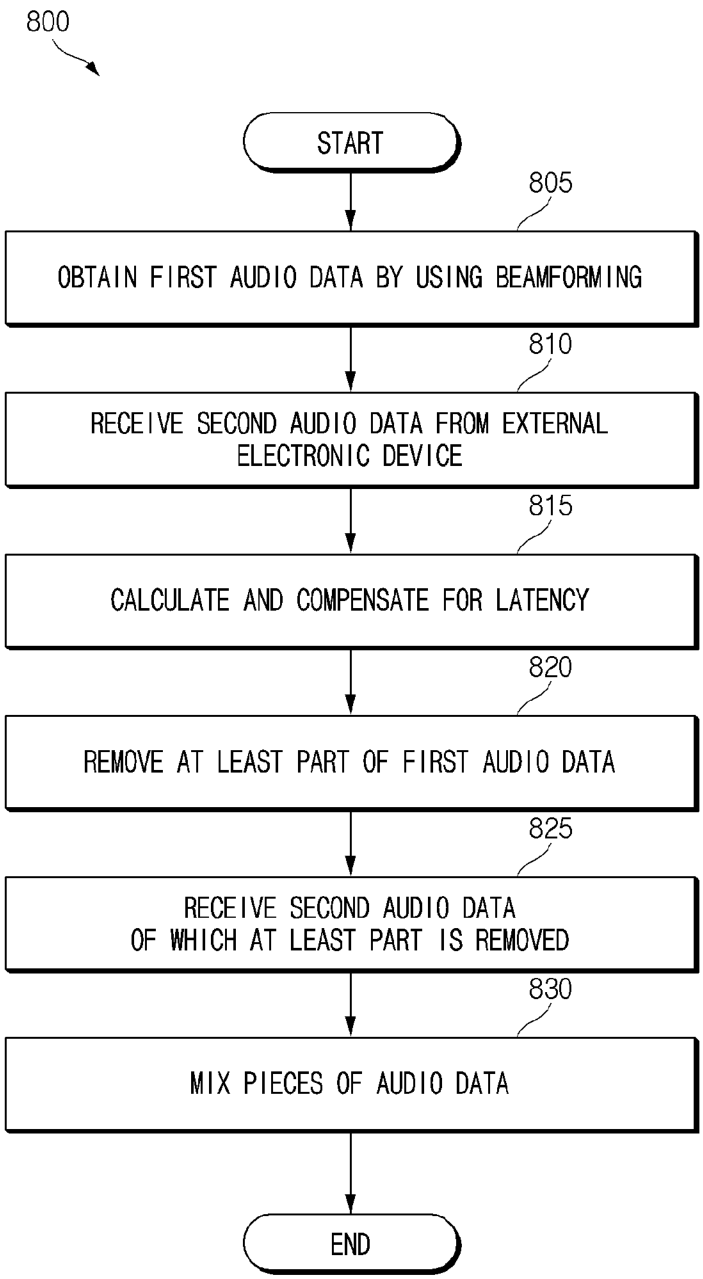
FIG. 8 is a flowchart of an audio data processing operation of an electronic device and an external electronic device, according to an embodiment of the disclosure.

FIG. 8 is a flowchart 800 of an audio data processing operation of an electronic device, according to an embodiment.

According to an embodiment, an electronic device (e.g., the electronic device 301 of FIG. 3) or an external electronic device (e.g., the external electronic device 302 in FIG. 3) may perform operations illustrated in FIG. 8. For example, a processor of the electronic device (e.g., the processor 120 of FIG. 1) may be configured to perform operations of FIG. 8 when instructions stored in a memory (e.g., the memory 130 of FIG. 1) are executed.

In operation 805, the electronic device may obtain first audio data by using a beamforming operation. For example, the electronic device may further include a beamformer (e.g., the beamformer 380 in FIG. 3). According to an embodiment, the beamformer may perform a beamforming operation necessary to improve directivity while a plurality of audio input devices included in the electronic device obtain audio data. For example, the beamformer may maintain a first signal received in a specified direction (e.g., a direction of a near-end talker). On the other hand, the beamformer may perform an operation of at least partially removing the second signal received in a direction (e.g., a direction of a far-end talker) other than the specified direction. For example, the beamformer may include a MVDR beamformer. For example, the beamformer may be implemented as a GSC. The electronic device may perform an operation of maintaining the first signal received from a first user (e.g., a near-end talker) by using a beamforming operation, and obtaining and minimizing the second signal received from a second user (e.g., a far-end talker).

In operation 810, the electronic device may receive second audio data from an external electronic device. For example, the second audio data may be referred to as "synthetic data" of a third signal and a fourth signal. For example, the third signal is an audio signal received by the external electronic device by using an audio input device (e.g., the audio circuit 371 in FIG. 3) from the second user (e.g., a near-end talker based on external electronic device). The fourth signal may be an audio signal received by the external electronic device by using an audio input device from a first user (e.g., a far-end talker based on external electronic device).

In operation 815, the electronic device may calculate and compensate for the latency. According to an embodiment of the disclosure, operation 815 of FIG. 8 may be referred to as substantially the same operation as operation 610 of FIG. 6. For example, a description of operation 815 of FIG. 8 may be replaced with a description of operation 610 of FIG. 6 described above.

In operation 820, the electronic device may remove at least part of the first audio data. According to an embodiment of the disclosure, operation 820 of FIG. 8 may be referred to as substantially the same operation as operation 615 of FIG. 6. For example, a description of operation 820 of FIG. 8 may be replaced with a description of operation 615 of FIG. 6 described above.

In operation 825, the electronic device may receive the second audio data of which at least part is removed. For example, the electronic device may receive the second audio data, from which the fourth signal is removed, from the external electronic device through a wireless communication circuit. For example, the external electronic device may remove a fourth signal included in the second audio data. For another example, the external electronic device may change a frequency band of the second audio data. The external electronic device may change the frequency band of the second audio data by using a BWE module (e.g., the BWE module 381 in FIG. 3) (e.g., BWE module). The external electronic device may change the frequency band of the second audio data, may remove the fourth signal, and may transmit the second audio data, from which the fourth signal is removed, to the electronic device.

In operation 830, the electronic device may mix pieces of audio data. According to an embodiment of the disclosure, operation 830 of FIG. 8 may be referred to as substantially the same operation as operation 625 of FIG. 6. For example, a description of operation 830 of FIG. 8 may be replaced with a description of operation 625 of FIG. 6 described above.

Figure 9:
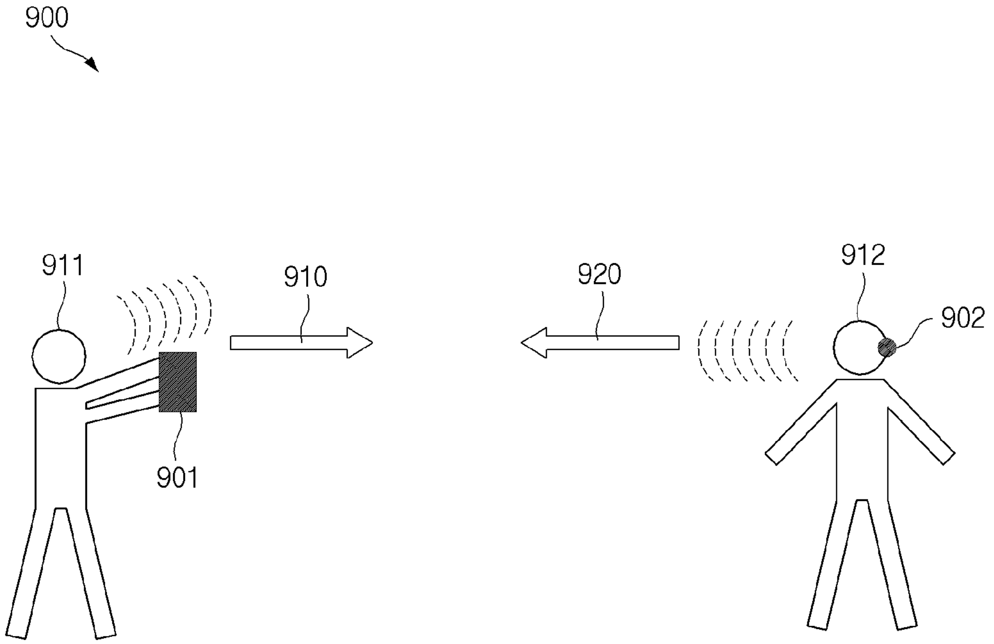
FIG. 9 illustrates a conceptual diagram of an audio data processing operation of an electronic device and an external electronic device, according to an embodiment of the disclosure.

FIG. 9 illustrates a conceptual diagram 900 of an audio data processing operation of an electronic device 901 and an external electronic device 902, according to an embodiment.

According to an embodiment, the electronic device 901 (e.g., the electronic device 101 in FIG. 1 or the electronic device 301 in FIG. 3) may transmit and/or receive various pieces of data with the external electronic device 902 (e.g., the electronic device 102 in FIG. 1 or the external electronic device 302 in FIG. 3).

According to an embodiment, the electronic device 901 may obtain various pieces of data through an audio input device (e.g., the audio circuit 370 in FIG. 3). In other words, the electronic device 901 may obtain first audio data, which is synthetic data of a first signal received from a near-end talker (e.g., the first user 911) based on the electronic device 901, and a second signal received from a far-end talker (e.g., the second user 912) based on the electronic device 901, through an audio input device.

According to an embodiment, the external electronic device 902 may obtain various pieces of data through an audio input device (e.g., the audio circuit 371 in FIG. 3). For example, the external electronic device 902 may obtain second audio data, which is synthetic data of the third signal received from a near-end talker (e.g., the second user 912) based on the external electronic device 902 and the fourth signal received from a far-end talker (e.g., the first user 911) based on the external electronic device 902, through an audio input device.

According to an embodiment, the electronic device 901 may receive various pieces of data through a wireless communication circuit (e.g., the wireless communication circuit 390 of FIG. 3). Referring to reference number 920, the electronic device 901 may receive second audio data, which is synthetic data of the third signal and the fourth signal, from the external electronic device 902 through the wireless communication circuit.

According to an embodiment, the electronic device 901 may perform a processing operation on pieces of audio data. For example, the electronic device 901 may calculate latency by using the first audio data and the second audio data. For example, the electronic device 901 may calculate latency based on the first audio data and the second audio data by using a latency prediction unit (e.g., the latency prediction unit 350 in FIG. 3). For another example, the electronic device 901 may compensate for (or interpolate) the latency. For example, the electronic device 901 may compensate for the calculated latency by using a latency compensation unit (e.g., the latency compensation unit 350 in FIG. 3). For example, the electronic device 901 may remove the second signal included in the first audio data based on the third signal included in the second audio data by using a reverberation cancellation unit (e.g., the reverberation cancellation unit 360 in FIG. 3).

According to an embodiment, the electronic device 901 may transmit various pieces of data to the outside through a wireless communication circuit. For example, referring to reference number 910, the electronic device 901 may transmit, to the external electronic device 902, the first audio data, from which a second signal is removed, by using a reverberation cancellation unit.

According to an embodiment, the external electronic device 902 may perform various audio data processing operations by using pieces of audio data received from the electronic device 901. For example, the external electronic device 902 may remove the fourth signal included in second audio data by using the first audio data from which the second signal received from the electronic device 901 is removed. The external electronic device 902 may transmit the second audio data, from which the fourth signal is removed, to the electronic device 901.

According to an embodiment, the electronic device 901 may receive the second audio data, from which the fourth signal is removed, from the external electronic device 902 through a wireless communication circuit. For example, the electronic device 901 may mix the second audio data, from which the received fourth signal is removed, with other pieces of audio data. For example, the electronic device 901 may generate synthetic data by mixing the first audio data, from which the second signal is removed, and the second audio data, from which the fourth signal is removed, by using a synthesis unit (e.g., the synthesis unit 365 in FIG. 3). The electronic device 901 may output the generated synthetic data to the outside by using an audio output device (e.g., the audio circuit 370 in FIG. 3).

Figure 10:
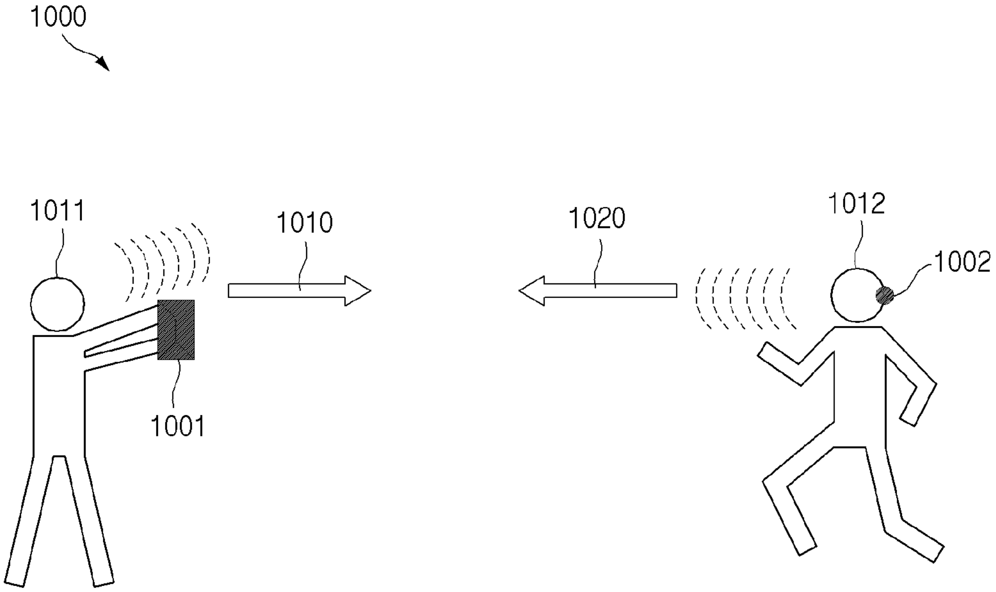
FIG. 10 illustrates a conceptual diagram of an audio data processing operation of an electronic device and an external electronic device, according to an embodiment of the disclosure.

FIG. 10 illustrates a conceptual diagram 1000 of an audio data processing operation of an electronic device 1001 and an external electronic device 1002, according to an embodiment.

According to an embodiment, the electronic device 1001 (e.g., the electronic device 101 in FIG. 1 or the electronic device 301 in FIG. 3) may transmit and/or receive various pieces of data with the external electronic device 1002 (e.g., the electronic device 102 in FIG. 1 or the external electronic device 302 in FIG. 3). In FIG. 10, descriptions of the same components (e.g., a first user 1011 and a second user 1012) or the same audio data transmission/reception process (e.g., reference number 1010 and reference number 1020) as in FIG. 9 may be replaced with the description of FIG. 9. Hereinafter, a difference from the embodiment of FIG. 9 will be mainly described.

According to an embodiment, the electronic device 1001 may calculate various parameters based on pieces of audio data. For example, the electronic device 1001 may calculate latency based on pieces of audio data. The electronic device 1001 may use a latency prediction unit (e.g., the latency prediction unit 340 of FIG. 3) to calculate the latency.

According to an embodiment, the electronic device 1001 may include a latency prediction unit. The latency prediction unit may include a system delay prediction unit and/or an acoustic delay prediction unit. For example, the electronic device 1001 may calculate system latency, which is generated while the electronic device 1001 performs wireless communication with the external electronic device 1002, by using the system delay prediction unit included in the latency prediction unit. For another example, the electronic device 1001 may calculate acoustic latency, which is generated as a location of the external electronic device 1002 is changed based on the electronic device 1001, by using the acoustic delay prediction unit included in the latency prediction unit. For example, as a user (e.g., the second user 1012) employing the external electronic device 1002 moves, the location of the external electronic device 1002 performing wireless communication with the electronic device 1001 may be changed based on the electronic device 1001. As the user (e.g., the second user 1012) employing the external electronic device 1002 moves, the location of the external electronic device 1002 may be changed. The electronic device 1001 may calculate acoustic latency, which is generated as the location of the external electronic device 1002 is changed, by using an acoustic delay prediction unit included in a latency prediction unit. The electronic device 1001 may extract a dominant frequency band of the first audio data and the second audio data by using the acoustic delay prediction unit and may calculate the acoustic latency in the dominant frequency band based on a cross-correlation method. In the above embodiment, it is described that the electronic device calculates the acoustic latency within a dominant frequency band based on a cross-correlation method, but embodiments of the disclosure are not limited thereto. For example, the electronic device may calculate acoustic latency by using convolution.

According to an embodiment disclosed in this specification, an electronic device may include a latency prediction unit, a latency compensation unit, a reverberation cancellation unit, a wireless communication circuit that performs wireless communication with an external electronic device, an audio input device, a processor, and a memory operatively connected to the processor. For example, the memory may store one or more instructions, when executed, causing the processor to obtain first audio data, which is synthetic data of a first signal received from a near-end talker and a second signal received from a far-end talker, through the audio input device, to receive second audio data, which is synthetic data of a third signal and a fourth signal, from the external electronic device through the wireless communication circuit, to calculate a latency based on the first audio data and the second audio data, by using the latency prediction unit, to compensate for the calculated latency with respect to the second audio data, by using the latency compensation unit, and to remove the second signal included in the first audio data based on the third signal included in the second audio data, the latency of which is compensated for, by using the reverberation cancellation unit.

According to an embodiment, the electronic device may further include a beamformer. The one or more instructions, when executed, cause the processor to remove the second signal of the first audio data, which is received from the far-end talker, by using the beamformer.

According to an embodiment, the electronic device may further include an audio output device. When executed, the one or more instructions may cause the processor to output the first audio data from which the second signal is removed, by using the audio output device.

According to an embodiment, when executed, the one or more instructions may cause the processor to transmit the first audio data, from which the second signal is removed, to the external electronic device through the wireless communication circuit.

According to an embodiment, when executed, the one or more instructions may cause the processor to receive the second audio data, from which the fourth signal is removed, from the external electronic device through the wireless communication circuit after transmitting the first audio data, from which the second signal is removed, to the external electronic device.

According to an embodiment, the electronic device may further include a synthesis unit and a display. When executed, the one or more instructions may cause the processor to display a user interface corresponding to a function for mixing pieces of audio data in the display, and to generate synthetic data by mixing the first audio data from which the second signal is removed and the second audio data from which the fourth signal is removed, by using the synthesis unit when it is determined that a specified input on the user interface is sensed.

According to an embodiment, the second audio data from which the fourth signal is removed is audio data output after a frequency band of audio data obtained by the external electronic device is changed to a specified frequency band through a bandwidth extension (BWE) module or filter included in the external electronic device.

According to an embodiment, the latency prediction unit may include a system delay prediction unit and an acoustic delay prediction unit. When executed, the one or more instructions may cause the processor to calculate a system latency, which occurs when the electronic device performs the wireless communication with the external electronic device, by using the system delay prediction unit, to calculate an acoustic latency, which occurs when there is changed a location of the external electronic device relative to the electronic device, by using the acoustic delay prediction unit, and to compensate for the system latency and the acoustic latency thus calculated, by using the latency compensation unit.

According to an embodiment, when executed, the one or more instructions may cause the processor to extract a dominant frequency band of the first audio data and the second audio data, by using the acoustic delay prediction unit.

According to an embodiment, when executed, the one or more instructions may cause the processor to calculate the acoustic latency in the dominant frequency band based on a cross-correlation method.

According to an embodiment disclosed in this specification, a method for providing a function in which an electronic device processes audio data may include obtaining first audio data, which is synthetic data of a first signal received from a near-end talker and a second signal received from a far-end talker, through an audio input device, receiving second audio data, which is synthetic data of a third signal and a fourth signal, from external electronic device through a wireless communication circuit, calculating a latency based on the first audio data and the second audio data, by using a latency prediction unit, compensating for the calculated latency with respect to the second audio data, by using a latency compensation unit, and removing the second signal included in the first audio data based on the third signal included in the second audio data, the latency of which is compensated for, by using a reverberation cancellation unit.

According to an embodiment, the obtaining of the first audio data, which is the synthetic data of the first signal received from the near-end talker and the second signal received from the far-end talker, through the audio input device may include obtaining the first audio data, by using a beamformer.

According to an embodiment, the method for providing the function in which an electronic device processes audio data may further include outputting the first audio data, from which the second signal is removed, by using an audio output device.

According to an embodiment, the method for providing the function in which an electronic device processes audio data may further include transmitting the first audio data, from which the second signal is removed, to the external electronic device through the wireless communication circuit.

According to an embodiment, the method for providing the function in which an electronic device processes audio data may further include receiving the second audio data, from which the fourth signal is removed, from the external electronic device through the wireless communication circuit after transmitting the first audio data, from which the second signal is removed, to the external electronic device.

According to an embodiment, the method for providing the function in which an electronic device processes audio data may further include displaying a user interface corresponding to a function for mixing pieces of audio data in a display, and generating synthetic data by mixing the first audio data from which the second signal is removed and the second audio data from which the fourth signal is removed, by using a synthesis unit when it is determined that a specified input on the user interface is sensed.

According to an embodiment, the second audio data from which the fourth signal is removed is audio data output after a frequency band of audio data obtained by the external electronic device is changed to a specified frequency band through a bandwidth extension (BWE) module included in the external electronic device.

According to an embodiment, the calculating of the latency based on the first audio data and the second audio data by using the latency prediction unit and the compensating for the calculated latency by using the latency compensation unit may include calculating a system latency, which occurs when the electronic device performs wireless communication with the external electronic device, by using a system delay prediction unit included in the latency prediction unit, calculating an acoustic latency, which occurs when there is changed a location of the external electronic device relative to the electronic device, by using an acoustic delay prediction unit included in the latency prediction unit, and compensating for the system latency and the acoustic latency thus calculated, by using the latency compensation unit.

According to an embodiment, the calculating of the acoustic latency, which occurs when there is changed a location of the external electronic device relative to the electronic device, by using the acoustic delay prediction unit included in the latency prediction unit may include extracting a dominant frequency band of the first audio data and the second audio data, by using the acoustic delay prediction unit.

According to an embodiment, the extracting of the dominant frequency band of the first audio data and the second audio data by using the acoustic delay prediction unit may include calculating the acoustic latency in the dominant frequency band based on a cross-correlation method.

What is claimed is:

1. An electronic device comprising:
- a wireless communication circuit configured to perform wireless communication with an external electronic device;
- an audio input device;
- at least one memory storing one or more instructions; and
- at least one processor operatively connected to the at least one memory and configured to execute the one or more instructions to:
  - obtain first audio data through the audio input device, wherein the first audio data is synthetic data of a first signal received from a first talker and a second signal received from a second talker, and the first talker is closer to the electronic device than the second talker at the time the first audio data is obtained,
  - receive second audio data from the external electronic device through the wireless communication circuit, wherein the second audio data is synthetic data of a third signal and a fourth signal,
  - obtain a latency based on the first audio data and the second audio data, obtain compensated first audio data by compensating for the latency with respect to the second audio data, and obtain processed first audio data by removing the second signal from the compensated first audio data based on the third signal.

2. The electronic device of claim 1, wherein the at least one processor is further configured to execute the one or more instructions to:

obtain the processed first audio data by removing the second signal from the compensated first audio data via beamforming.

3. The electronic device of claim 1, further comprising:

an audio output device, wherein the at least one processor is further configured to execute the one or more instructions to:

output the processed first audio data via the audio output device.

4. The electronic device of claim 1, wherein the at least one processor is further configured to execute the one or more instructions to:

transmit the processed first audio data to the external electronic device through the wireless communication circuit.

5. The electronic device of claim 4, wherein the at least one processor is further configured to execute the one or more instructions to:

after transmitting the processed first audio data to the external electronic device, receive third audio data comprising the second audio data without the fourth signal, from the external electronic device through the wireless communication circuit.

6. The electronic device of claim 5, further comprising:

a display, wherein the at least one processor is further configured to execute the one or more instructions to:

display, on the display, a user interface corresponding to a function for mixing pieces of audio data; and based on determining that a specified input on the user interface is sensed, generate synthetic data by mixing the processed first audio data and the third audio data.

7. The electronic device of claim 5, wherein the a first frequency band of the third audio data is changed to a second frequency band through a bandwidth extension filter.

8. The electronic device of claim 1, wherein the latency based on the first audio data and the second audio data comprises a system latency and an acoustic latency, and wherein the at least one processor is further configured to execute the one or more instructions to:

obtain the system latency based on wireless communication between the electronic device and the external electronic device; and obtain the acoustic latency based on a change in a location of the external electronic device relative to the electronic device.

9. The electronic device of claim 8, wherein the at least one processor is further configured to execute the one or more instructions to:

identify a dominant frequency band of the first audio data and the second audio data.

10. The electronic device of claim 9, wherein the at least one processor is further configured to execute the one or more instructions to:

obtain the acoustic latency based on the dominant frequency band based on a cross-correlation method.

11. A method of processing audio data using an electronic device, the method comprising:

obtaining first audio data through an audio input device of the electronic device, wherein the first audio data is synthetic data of a first signal received from a first talker and a second signal received from a second talker, and the first talker is closer to the electronic device than the second talker at the time the first audio data is obtained;

receiving second audio data from an external electronic device through a wireless communication circuit of the electronic device, wherein the second audio data is synthetic data of a third signal and a fourth signal;

obtaining a latency based on the first audio data and the second audio data;

obtain compensated first audio data by compensating for the latency with respect to the second audio data; and obtaining processed first audio data removing the second signal from the compensated first audio data based on the third signal.

12. The method of claim 11, wherein the obtaining the processed first audio data further comprises removing the second signal from the compensated first audio data via beamforming.

13. The method of claim 11, further comprising:

outputting the processed first audio data via an audio output device of the electronic device.

14. The method of claim 11, further comprising:

transmitting the processed first audio data to the external electronic device through the wireless communication circuit.

15. The method of claim 14, further comprising:

after transmitting the processed first audio data to the external electronic device, receiving third audio data comprising the second audio data without the fourth signal, from the external electronic device through the wireless communication circuit.

16. The method of claim 15, further comprising:

displaying, on a display of the electronic device, a user interface corresponding to a function for mixing pieces of audio data; and based on determining that a specified input on the user interface is sensed, generating synthetic data by mixing the processed first audio data and the third audio data.

17. The method of claim 15, a first frequency band of the third audio data is changed to a second frequency band through a bandwidth extension filter.

18. The method of claim 11, wherein the calculating of the latency based on the first audio data and the second audio data comprises:

obtaining a system latency based on wireless communication between the electronic device and the external electronic device; and obtaining an acoustic latency based on a change in a location of the external electronic device relative to the electronic device.

19. The method of claim 18, wherein the calculating of the acoustic latency comprises identifying a dominant frequency band of the first audio data and the second audio data.

20. The method of claim 19, wherein the identifying the dominant frequency band of the first audio data and the second audio data comprises obtaining the acoustic latency in the dominant frequency band based on a cross-correlation method.

* * * * *